(12) United States Patent
Sato

(10) Patent No.: US 8,350,813 B2
(45) Date of Patent: Jan. 8, 2013

(54) DIGITIZER AND INPUT DEVICE

(75) Inventor: Yuta Sato, Kawagoe (JP)

(73) Assignee: Wacom Co., Ltd., Saitama (JP)

( * ) Notice: Subject to any disclaimer, the term of this patent is extended or adjusted under 35 U.S.C. 154(b) by 1091 days.

(21) Appl. No.: 12/270,802

(22) Filed: Nov. 13, 2008

(65) Prior Publication Data
US 2010/0116560 A1 May 13, 2010

(51) Int. Cl.
*G06F 3/033* (2006.01)
*G06F 1/16* (2006.01)

(52) U.S. Cl. ........ 345/168; 345/156; 345/157; 345/163; 345/164; 345/169; 345/173; 178/18.01; 361/679.21; 361/679.56

(58) Field of Classification Search ............... 345/173, 345/156, 87, 163, 164, 168, 169, 175, 905, 345/157; 361/679.09, 679.27, 679.11, 679.29, 361/679.4, 679.54, 679.56, 679.21; 455/90.3, 455/128, 347, 354; 16/337, 341; 248/455; 341/20, 22, 31, 420; 250/221; 235/472.01; 178/18.01
See application file for complete search history.

(56) References Cited

U.S. PATENT DOCUMENTS

| | | | | |
|---|---|---|---|---|
| 5,448,044 A * | 9/1995 | Price et al. | | 235/380 |
| 6,154,196 A * | 11/2000 | Fleck et al. | | 345/157 |
| 6,874,744 B2 | 4/2005 | Rawlings | | |
| 7,025,274 B2 * | 4/2006 | Solomon et al. | | 235/472.01 |
| 7,232,098 B2 | 6/2007 | Rawlings | | |
| 2005/0127782 A1 * | 6/2005 | Endo et al. | | 310/323.02 |
| 2006/0113338 A1 * | 6/2006 | Harrison, Jr. | | 224/219 |
| 2007/0035917 A1 * | 2/2007 | Hotelling et al. | | 361/683 |
| 2008/0224196 A1 | 9/2008 | Higashino | | |
| 2008/0246730 A1 * | 10/2008 | Simons | | 345/164 |

FOREIGN PATENT DOCUMENTS

| | | |
|---|---|---|
| EP | 0 694 865 A2 | 1/1996 |
| EP | 0 732 665 A1 | 9/1996 |
| FR | 1340928 | 10/1963 |
| JP | 58-135984 U | 9/1983 |
| JP | 60-187097 A | 9/1985 |

(Continued)

OTHER PUBLICATIONS

European Search Report dated Mar. 25, 2009, issued in corresponding European Application No. 08019712.

(Continued)

*Primary Examiner* — Quan-Zhen Wang
*Assistant Examiner* — Michael J Eurice
(74) *Attorney, Agent, or Firm* — Seed IP Law Group PLLC

(57) ABSTRACT

A digitizer includes a case having an input portion; at least three first projected portions fixed to the case, the first projected portions coming into contact with a placement surface so as to support the case on the placement surface; and a second projected portion arranged inside of an area defined by connecting the points at which the first projected portions are fixed to the case. The second projected portion is configured such that, when a force substantially parallel to the placement surface is applied to the case, the first projected portions slide against the placement surface so that the case rotates relative to the placement surface with the second projected portion as a rotation axis.

19 Claims, 13 Drawing Sheets

FOREIGN PATENT DOCUMENTS

| | | |
|---|---|---|
| JP | 3-268012 A | 11/1991 |
| JP | 6214700 A | 8/1994 |
| JP | 10-13766 A | 1/1998 |
| JP | 2002-312065 A | 10/2002 |
| JP | 2004-38629 A | 2/2004 |
| JP | 2006-279704 A | 10/2006 |
| JP | 2007066365 A | 3/2007 |

OTHER PUBLICATIONS

Office Action, for corresponding Japanese Application No. 2007-278126, dated Nov. 15, 2011, 3 pages.

Office Action, for corresponding Japanese Application No. 2007-278126, dated Jan. 31, 2012, 3 pages.

* cited by examiner

DIGITIZER AND INPUT DEVICE

BACKGROUND OF THE INVENTION

1. Field of the Invention

The present invention relates to a digitizer for performing, with an input tool such as a finger or a position indicator, handwriting input operation such as handwriting a character or hand-drawing an illustration, and an input device including such digitizer.

2. Description of the Related Art

Examples of known digitizers are found in Japanese Unexamined Patent Application Publication No. H6-214700, which discloses a coordinate detecting device for performing coordinate input operation on an external device such as a computer.

The coordinate detecting device disclosed in Japanese Unexamined Patent Application Publication No. H6-214700 includes a circuit board, a case containing the circuit board therein, and a cable extending from the circuit board to the outside of the case to electrically connect the circuit board to the external device. Further, guiding holes for inserting check pins are arranged in a portion of the case. Further, check terminals for taking input/output signals exchanged between the circuit board and the external device are provided on the circuit board at a position where the check terminals can be electrically connected to the check pins when the check pins are inserted into the guiding holes.

Such a coordinate detecting device is placed on a desk to be connected to an external device, such as a personal computer and a PDA (Personal Digital Assistant), through the cable. A user performs handwriting input operation, such as handwriting a character or hand-drawing an illustration, on an effective area (i.e., an input portion) of the coordinate detecting device with a position indicator (e.g., a pen-like input tool), just like drawing a character or illustration on a piece of paper with a writing utensil such as a pencil and a ballpoint pen. While the user is performing the input operation with the position indicator, the coordinate detecting device detects the coordinates indicated by the position indicator and transmits the detected coordinates to the external device, so that a pointing operation or a handwriting input operation, such as handwriting a character or hand-drawing an illustration, can be performed on the external device.

SUMMARY OF THE INVENTION

When drawing an illustration or a character on a piece of paper with a writing utensil such as a pen, a user may sometimes feel uneasy or uncomfortable to draw the illustration or character depending on the direction of the line of the illustration or character to be drawn or the orientation of the paper. In that case, the user may rotate the paper to change the orientation of the paper so that the illustration or character can be easily drawn. However, in the coordinate detecting device such as the one disclosed in Japanese Unexamined Patent Application Publication No. H6-214700, the case cannot be rotated to facilitate the handwriting input operation in a manner similar to rotating the paper when drawing an illustration or character on a piece of paper with a writing utensil. Thus, when performing handwriting input operation, if the case is oriented in a direction in which the user feels uncomfortable to perform the handwriting input operation, the user has to change his (or her) own position relative to the case so that the handwriting input operation becomes easy to perform. Accordingly, with the coordinate detecting device as disclosed in Japanese Unexamined Patent Application Publication No. H6-214700, the user has to change his (or her) own position or direction every time when he (or she) feels uneasy or uncomfortable to perform the handwriting input operation, depending on the direction of the line of the illustration or character to be drawn. Consequently, operability of such a coordinate detecting device is less than desirable, resulting in low working efficiency of the user.

Various exemplary embodiments of the present invention are directed to addressing the aforesaid problems, and to provide a user-friendly digitizer capable of being rotated to a direction in which the user feels comfortable to perform the handwriting input operation without having to change his (or her) position, and an input device including such digitizer.

A digitizer according to one aspect of the present invention includes: a case having an input portion; at least three first projected portions fixed to the case, wherein the first projected portions come into contact with a placement surface (e.g., a desk surface) so as to support the case on the placement surface; and a second projected portion arranged inside of an area defined by connecting the points at which the first projected portions are fixed to the case. The second projected portion is configured such that, when a force substantially parallel to the placement surface is applied to the case, the first projected portions slide against the placement surface to cause the case to rotate relative to the placement surface with the second projected portion as a rotation axis.

An input device according to another aspect of the present invention includes: a digitizer on which information is input; and an input tool for inputting information on the digitizer, wherein the digitizer comprises: a case having an input portion; at least three first projected portions fixed to the case, the first projected portions coming into contact with a placement surface so as to support the case on the placement surface; and a second projected portion arranged inside of an area defined by connecting the points at which the first projected portions are fixed to the case, where the second projected portion is configured such that, when a force substantially parallel to the placement surface is applied to the case, the first projected portions slide against the placement surface to cause the case to rotate relative to the placement surface with the second projected portion as a rotation axis.

With the digitizer and the input device according to various exemplary embodiments of the present invention, which provide the second projected portion capable of rotatably supporting the case, it becomes possible to easily rotate the case to the orientation or direction in which the user feels comfortable to perform the handwriting input operation, and therefore operability of the digitizer and the input device can be improved.

BRIEF DESCRIPTION OF THE DRAWINGS

FIGS. 9A to 9C show the second projected portion of the digitizer of the aforesaid embodiment, in which FIG. 9A is a perspective view seen from a front side thereof, FIG. 9B is a perspective view seen from a rear side thereof, and FIG. 9C is a cross section;

DETAILED DESCRIPTION OF THE PREFERRED EMBODIMENT(S)

An input device according to exemplary embodiments of the present invention will be described below with reference to the attached drawings. It should be understood that the present invention is not limited to these embodiments.

Figure 1:
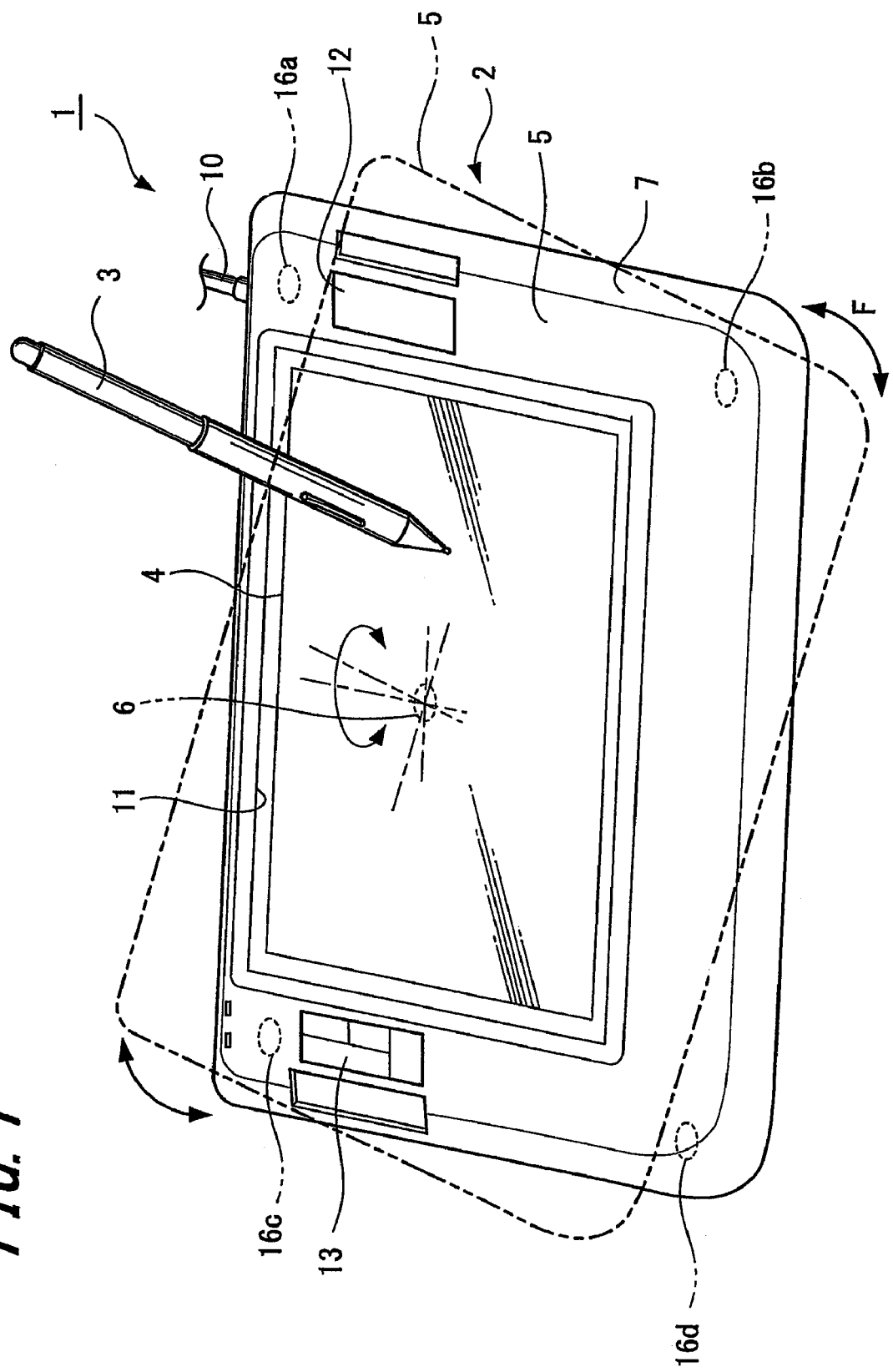
FIG. 1 is a perspective view showing an input device according to an embodiment of the present invention.

FIG. 1 is a perspective view showing the input device, and FIGS. 2 to 13 show a digitizer of the input device.

An input device 1 according to one embodiment includes a digitizer 2 on which information can be input, and a pen-like position indicator 3 for inputting information on the digitizer 2. The pen-like position indicator 3 is an example of an input tool. The digitizer 2 of the input device 1 is connected to an external device (not shown), such as a personal computer or a PDA (Personal Digital Assistant), through a cable 10, so that the input device 1 can be used as an input device of the external device.

The position indicator 3 works based on, for example, an electromagnetic resonance technology. A user uses the position indicator 3 to indicate the position of the position indicator 3 on the digitizer 2. The position indicator 3 has a resonant circuit resonating at a predetermined frequency. The resonant circuit resonates with a signal transmitted from the digitizer 2 and having the predetermined frequency, so that an induced voltage is generated in the resonant circuit. When the transmission of the signal from the digitizer 2 having the predetermined frequency is stopped, the induced voltage generated in the resonant circuit causes its position indicating coil to generate an electromagnetic wave. By transmitting the electromagnetic wave generated in the position indicating coil of the resonant circuit to the side of the digitizer 2, the position indicator 3 indicates its position on the digitizer 2.

The digitizer 2 includes an input portion 4, a thin rectangular parallelepiped-shaped hollow case 5 having the input portion 4, a second projected portion 6 rotatably supporting the case 5, and a plurality of first projected portions 16a to 16d.

As will be described later with reference to FIG. 5, the case 5 includes an upper case 7 having an opening 11 for exposing an input surface of the input portion 4, a lower case 8 overlapped with the upper case 7, and a frame 9 vertically partitioning a space defined by the upper case 7 and the lower case 8.

Figure 2:
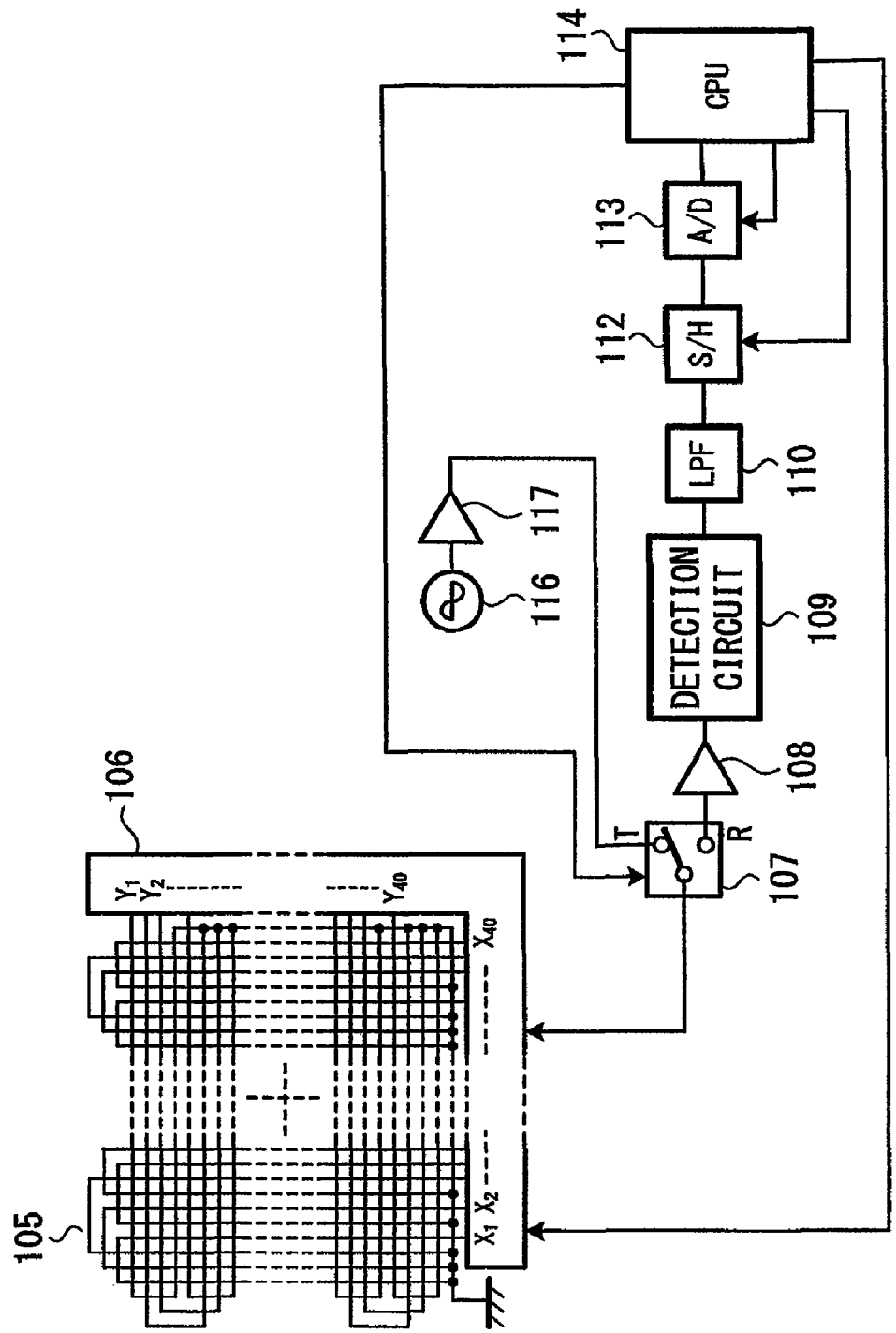
FIG. 2 is a block diagram showing a digitizer according to the aforesaid embodiment of the present invention.

FIG. 2 is a block diagram explaining the configuration and operation of the digitizer.

The input portion 4 includes a sheet-like position detecting section 105 which operates based on an electromagnetic resonance technology, and a display section (not shown) arranged behind the position detecting section 105.

The position detecting section 105 in the illustrated embodiment includes forty loop coils $X_1$-$X_{40}$ arranged in an X-axis direction and forty loop coils $Y_1$-$Y_{40}$ arranged in a Y-axis direction. The loop coils $X_1$-$X_{40}$ and loop coils $Y_1$-$Y_{40}$ are connected to a selecting circuit 106, which selects any one loop coil from the loop coils $X_1$-$X_{40}$ and any one loop from the loop Coils $Y_1$-$Y_{40}$. Note that, although the number of the loop coils in the X-axis direction and the Y-axis direction is set to forty in the present embodiment, the number of the loop coils is not limited to forty.

The selecting circuit 106 is connected to a transmission/reception switching circuit 107. A reception side terminal R of the transmission/reception switching circuit 107 is connected to an amplifier 108. The amplifier 108 is connected to a detection circuit 109, and the detection circuit 109 is connected to a sample-and-hold circuit (S/H circuit) 112 through a low-pass filter (LPF) 110. Further, the sample-and-hold circuit 112 is connected to an A/D conversion circuit (analog to digital conversion circuit) 113, and the A/D conversion circuit 113 is connected to a CPU (central processing unit) 114. The CPU 114 supplies control signals respectively to the selecting circuit 106, the sample-and-hold circuit 112, the A/D conversion circuit 113 and the transmission/reception switching circuit 107.

Further, the digitizer 2 is provided with an oscillator 116 for generating an AC signal having a frequency $f_0$ and a current driver 117 for converting the AC signal to a current. The current driver 117 is connected to a transmission side terminal T of the transmission/reception switching circuit 107. When the CPU 114 supplies a control signal to the transmission/reception switching circuit 107 to make it switch its contact point to the transmission side, a magnetic field is generated from the loop Coils $X_1$-$X_{40}$ and loop Coils $Y_1$-$Y_{40}$ of the position detecting section 105.

In a state where the transmission/reception switching circuit 107 is connected to the transmission side terminal T, when the position indicator 3 approaches the position detecting section 105, the resonant circuit provided inside the position indicator 3 will resonates so as to generate an induced voltage therein. Thereafter, when the CPU 114 supplies a control signal to the transmission/reception switching circuit 107 to make it switch its contact point to the reception side terminal R, the supply of the magnetic field from the position detecting section 105 to the position indicator 3 will stop. Thus, a magnetic field will be generated from the position indicating coil provided inside the position indicator 3.

The magnetic field generated by the position indicating coil is then detected by the loop coils $X_1$-$X_{40}$ and the loop coils $Y_1$-$Y_{40}$ of the position detecting section 105. Among the loop coils selected by the selecting circuit 106 from the loop coils $X_1$-$X_{40}$, there exists a loop coil which most strongly detects the magnetic field generated by the position indicator 3, and the position detecting section 105 detects the position of such a loop coil as an X-coordinate indicated by the position indicator 3; and among the loop coils selected by the selecting circuit 106 from the loop coils $Y_1$-$Y_{40}$, there exists a loop coil which most strongly detects the magnetic field generated by the position indicator 3, and the position detecting section 105 detects the position of such a loop coil as a Y-coordinate indicated by the position indicator 3. In such a manner, X-Y coordinates indicated by the position indicator 3 are detected by the position detecting section 105.

Note that, although the present embodiment is described using an example in which the position detecting section 105 performs coordinate detection based on an electromagnetic resonance technology, the present invention is not limited to that example. For example, the position detecting section may perform coordinate detection based on an electrostatic capacity technology, a pressure-sensitive technology, an optical detection technology or the like.

As shown in FIG. 1, the upper case 7 is formed in a thin container-like shape having one opened face. The upper case 7 has a quadrangular opening 11 for exposing the input surface of the input portion 4, and two touch pad portions 12 and 13 respectively arranged on both sides of the opening 11. The input portion 4 is fitted into the opening 11. Various operation buttons for performing operations such as setting the size of a drawing area, scrolling the screen, zooming-in/out the screen and the like are arranged in the two touch pad portions 12 and 13. Further, as shown in FIG. 4, a plurality of fixing portions 14 are provided on a rear side of the upper case 7. The plurality of fixing portions 14 are provided to fix a plurality of fixing screws 18 for attaching the lower case 8 (see FIGS. 3 and 5) and the frame 9 to the upper case 7.

Figure 3:
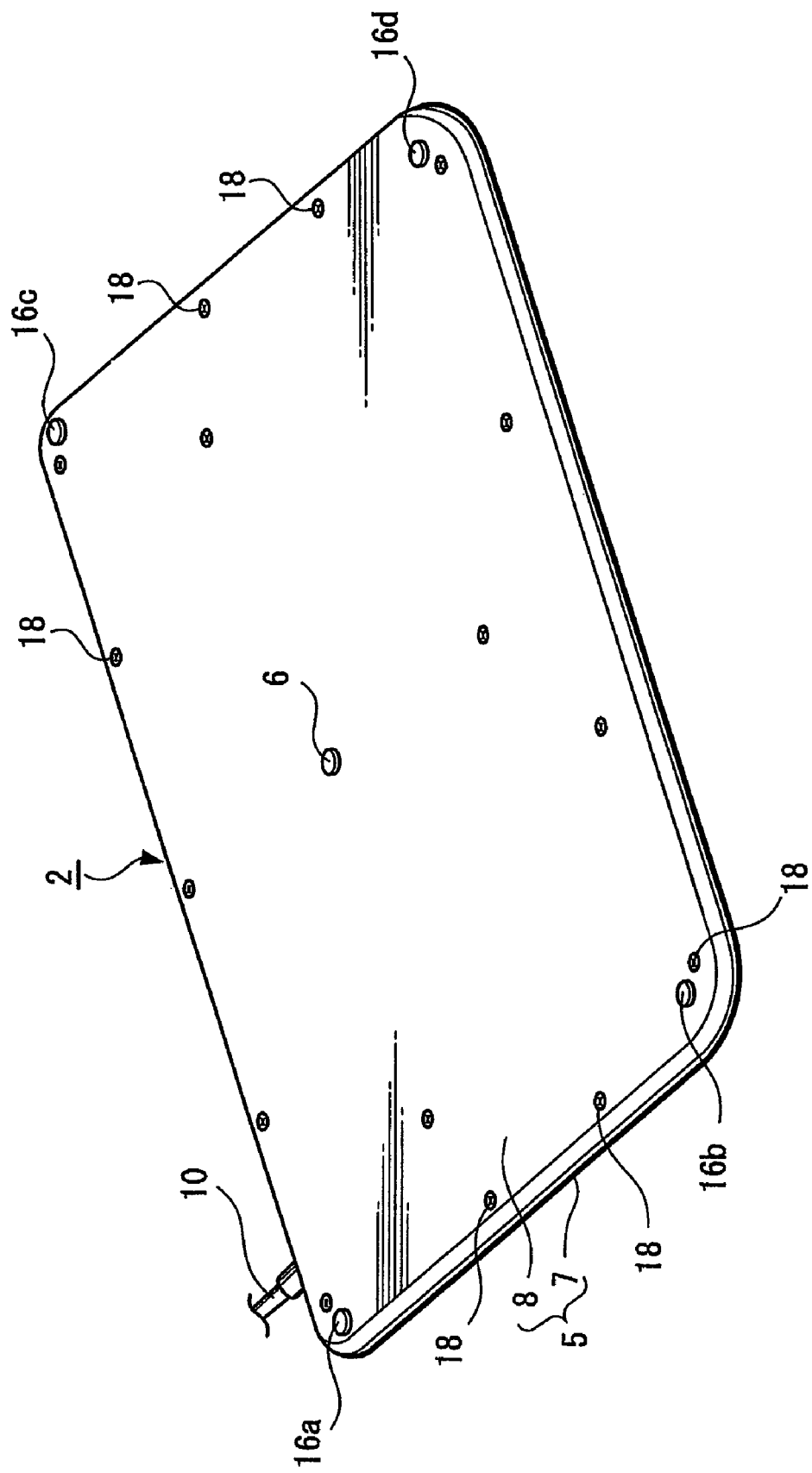
FIG. 3 is a perspective view of the digitizer when seen from a rear side thereof.
Figure 4:
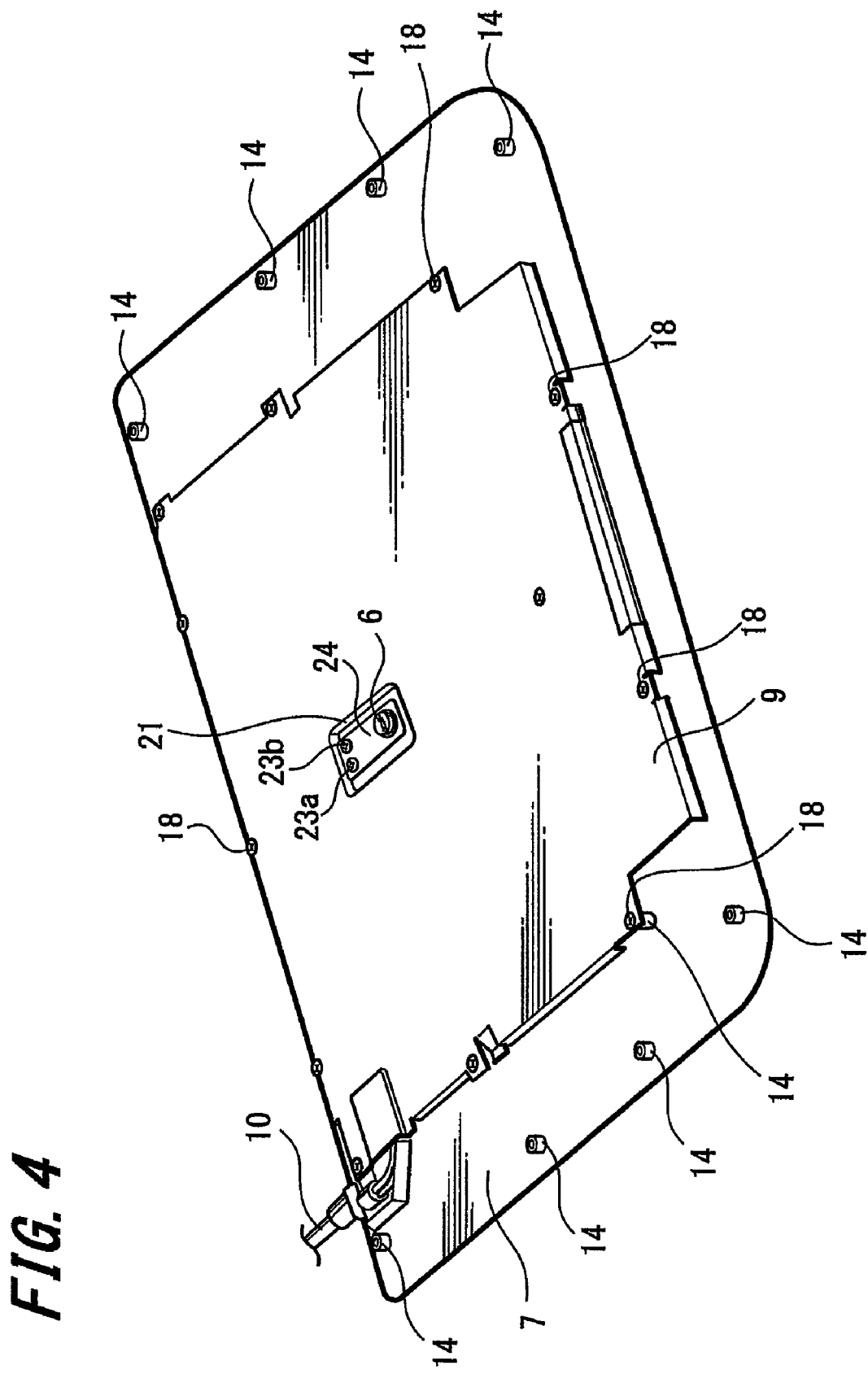
FIG. 4 is a perspective view of the digitizer of the aforesaid embodiment in a state where a lower case thereof is detached.

FIG. 3 is a perspective view of the digitizer of the present embodiment when seen from the rear side of the digitizer.

The lower case 8 is formed in, for example, a thin lid-like shape. The lower case 8 is overlapped with the upper case 7 so as to close the opening of the upper case 7. Further, the lower case 8 is fixed to the upper case 7 with the fixing screws 18. Note that, in order to more firmly fix the upper case 7 to the lower case 8, the fixing means between the upper case 7 and the lower case 8 is not limited to the fixing screws 18, but may be other fixing means such as, for example, an adhesive, welding and the like. The lower case 8 is provided with, on a rear surface (i.e., a lower surface) thereof, four first projected portions 16a, 16b, 16c and 16d which come into contact with a placement surface G of a desk or the like (see FIG. 10) so as to support the case 5 on the placement surface G.

The four first projected portions 16a, 16b, 16c and 16d are substantially cylindrical members, for example, and are fixed to the four corners of the rear surface of the lower case 8 with an adhesive, for example. Note that, the method of fixing the four first projected portions 16a to 16d to the lower case 8 is not limited to an adhesive, but may include other fixing methods. For example, the four first projected portions 16a to 16d may be screwed into the lower case 8 or fitted into the lower case 8. The four first projected portions 16a to 16d have substantially the same height so that one ends thereof in the axial direction are located in the same plane. Since the one ends of the four first projected portions 16a, 16b, 16c and 16d in the axial direction are located in the same plane, when placed on the desk or the like, the digitizer 2 can be used without rattling. Further, it is preferred that a material having a low friction coefficient is used as the material of the four first projected portions 16a to 16d (for example, felt may be used as the material of the four first projected portions 16a to 16d). Further, an insertion hole 17 (see FIG. 6) for inserting the second projected portion 6 is provided substantially in the central portion of the lower case 8 (i.e., the insertion hole 17 is provided within an area surrounded by the four first projected portions 16a to 16d).

Note that, although the number of the first projected portion is four in the present embodiment, the number of the first projected portion is not limited to four. For example, in order to support the case 5 in good balance, the number of the first projected portion may be at least three, or may be five or more than five. Further, although the first projected portion is formed in a cylindrical shape in the present embodiment, the shape of the first projected portion is not limited to the cylindrical shape, but may be, for example, a polygonal prism shape, a truncated-cone shape, a truncated-pyramid shape or the like.

An engineering plastic is generally used as the material of the upper case 7 and the lower case 8, however the material of the upper case 7 and the lower case 8 may also be others such as, for example, stainless steel.

FIG. 4 is a perspective view of the digitizer 2 of the present embodiment in a state where the lower case 8 thereof is detached. Further, FIG. 5 shows a cross section of the digitizer 2 of the present embodiment when it is cut in a longitudinal direction.

The frame 9 is a substantially flat plate-like member. The frame 9 is accommodated in the case 5 in a manner in which the frame 9 vertically partitions the space defined by the upper case 7 and the lower case 8. Further, the frame 9 covers the entire rear surface of the input portion 4 via spacers 19. The frame 9 is fixed to the upper case 7 with screws, for example. Further, a recessed portion 21 substantially recessed in a rectangle shape is formed in substantially the central portion of the frame 9. Note that, a steel plate made of, for example, stainless steel is generally used as the material of the frame 9, however other material, such as a plastic plate made of an engineering plastic, may be used as the material of the frame 9.

Figure 5:
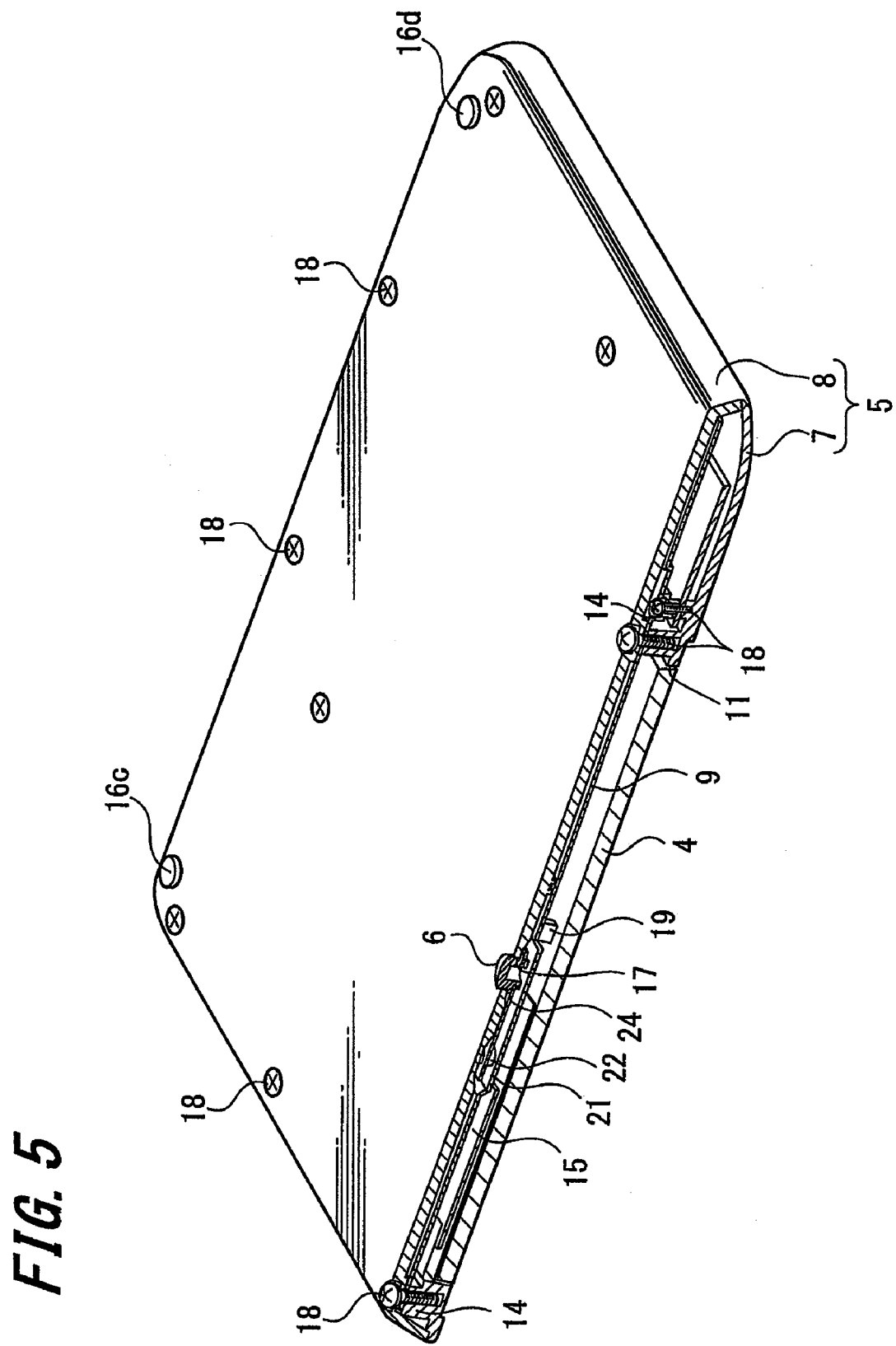
FIG. 5 is a partially cut-away view showing a cross section of the digitizer of the aforesaid embodiment.

Further, as shown in FIG. 5, a control board 15 including the CPU 114 and the like mounted thereon is arranged between the input portion 4 and the frame 9. As shown in FIG. 4, the cable 10 is connected to the control board 15. The input portion 4 transmits the input signal to the external device (not shown) through the cable 10.

Figure 6:
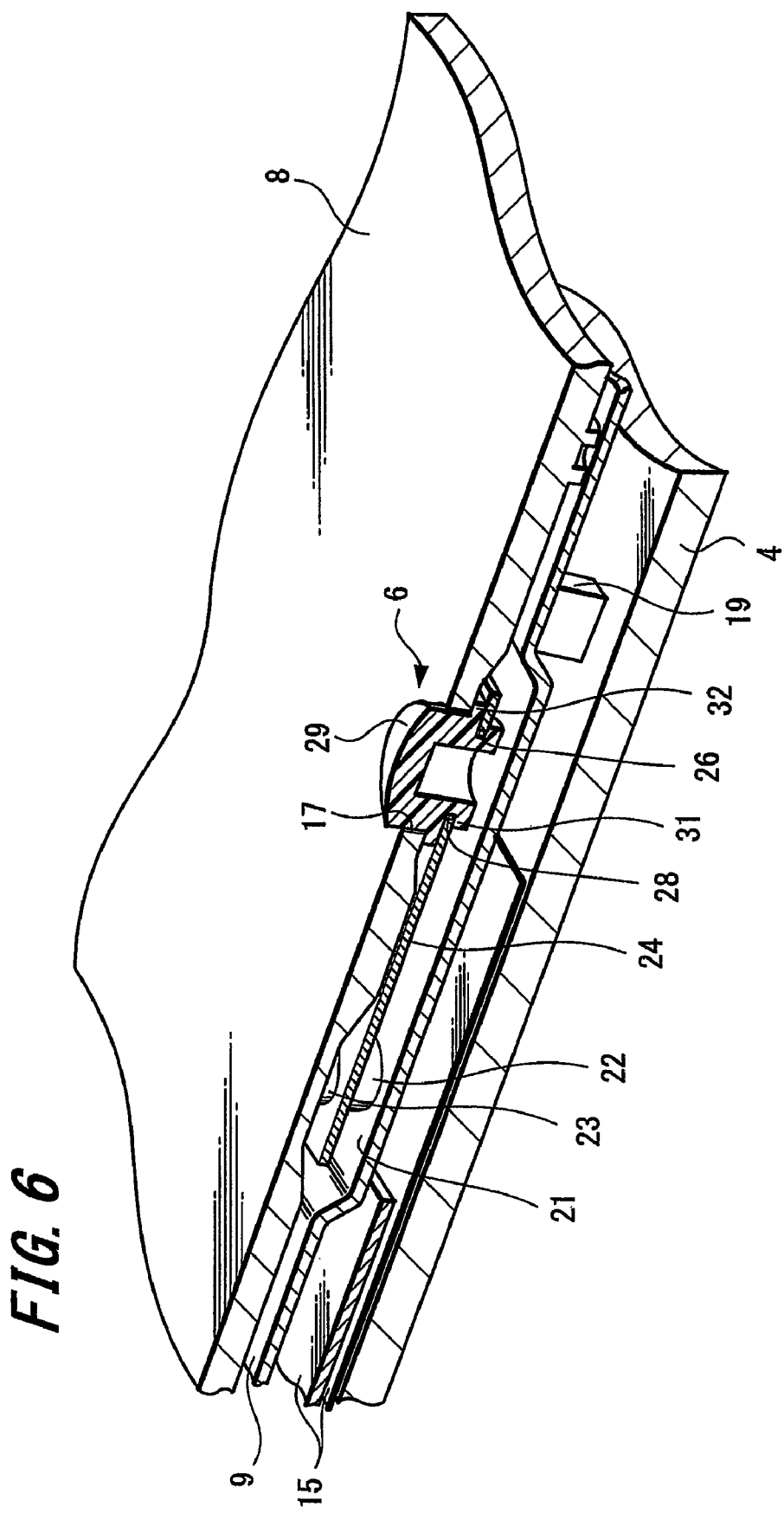
FIG. 6 is an enlarged cross section showing a second projected portion and an elastic body of the digitizer of the aforesaid embodiment.
Figure 7:
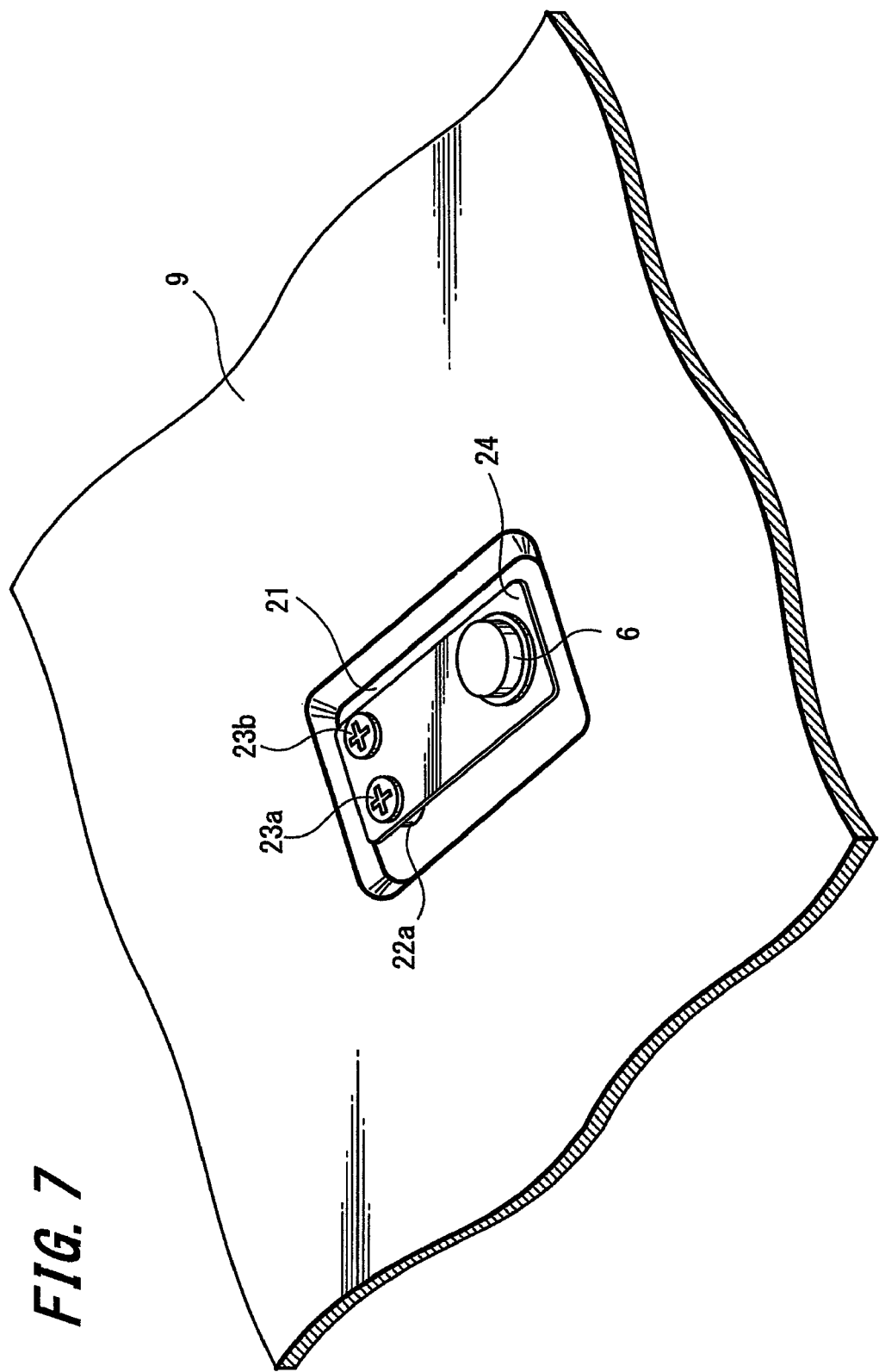
FIG. 7 is an enlarged perspective view showing the second projected portion and the elastic body of the digitizer of the aforesaid embodiment.

FIG. 6 is an enlarged cross section showing the second projected portion and an elastic body (a leaf spring 24) of the digitizer of the present embodiment, and FIG. 7 is an enlarged perspective view showing the second projected portion and the elastic body (the leaf spring 24) of the digitizer of the present embodiment.

In a state where the frame 9 is fixed to the upper case 7, the recessed portion 21 is recessed toward the side of the input portion 4. (See FIG. 6.) As shown in FIG. 7, the recessed portion 21 is provided with two fixing portions 22a and 22b, to which the leaf spring 24 is fixed by two fixing screws 23a and 23b. Since the leaf spring 24 is fixed by the two fixing screws 23a and 23b to the recessed portion 21 recessed toward the side of the upper case 7, the thickness of the case 5 can be prevented from being increased.

Figure 8:
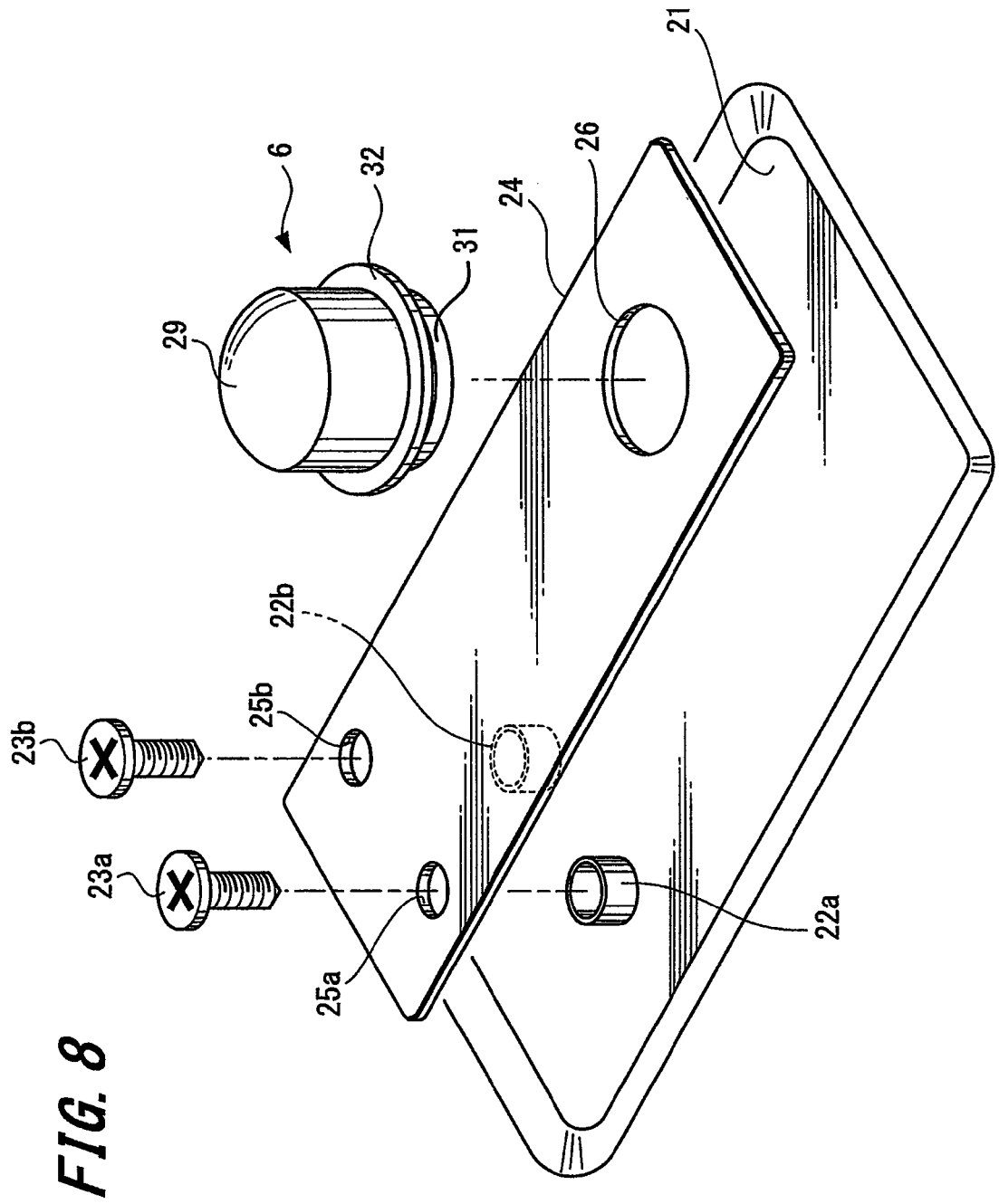
FIG. 8 is an exploded perspective view showing the second projected portion and the elastic body of the digitizer of the aforesaid embodiment.

FIG. 8 is an exploded perspective showing an example of attaching the second projected portion 6 to the elastic body (the leaf spring 24).

The leaf spring 24 has two fastening holes 25a and 25b formed on one side thereof in a longitudinal direction and an engaging hole 26 formed on the other side thereof in the longitudinal direction. The two fixing screws 23a and 23b are screwed into the two fastening holes 25a and 25b to fix the leaf spring 24 to the two fixing portions 22a and 22b provided on the recessed portion 21. An engaging groove 28 (FIGS. 9A-9C), which will be described later, of the second projected portion 6 is engaged with the engaging hole 26, and thereby the second projected portion 6 is attached to the leaf spring 24. Note that, although the present embodiment is described using an example in which the leaf spring is used as the elastic body, the elastic body is not limited to the leaf spring. For example, a coil spring, a rubber body or other elastic member may be used as the elastic body. Further, in the present embodiment, since the leaf spring 24 having small thickness is employed instead of employing a relatively thick elastic body such as a coil spring, it becomes possible to reduce the thickness of the case 5.

Figure 9A:
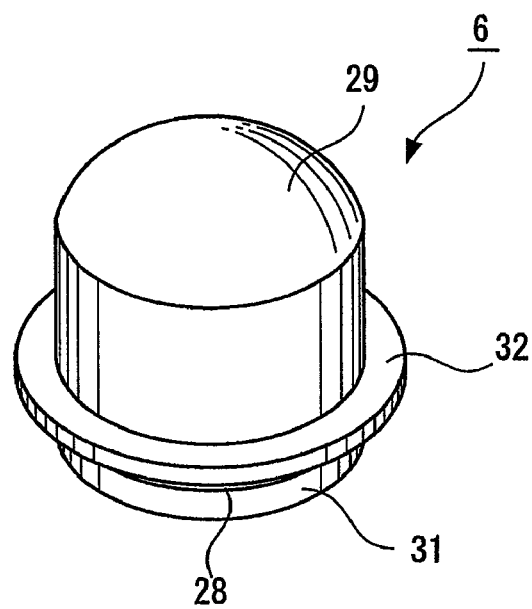
Figure 9B:
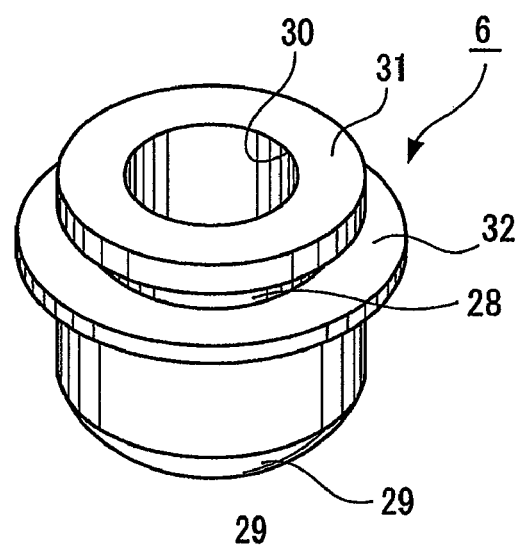
Figure 9C:
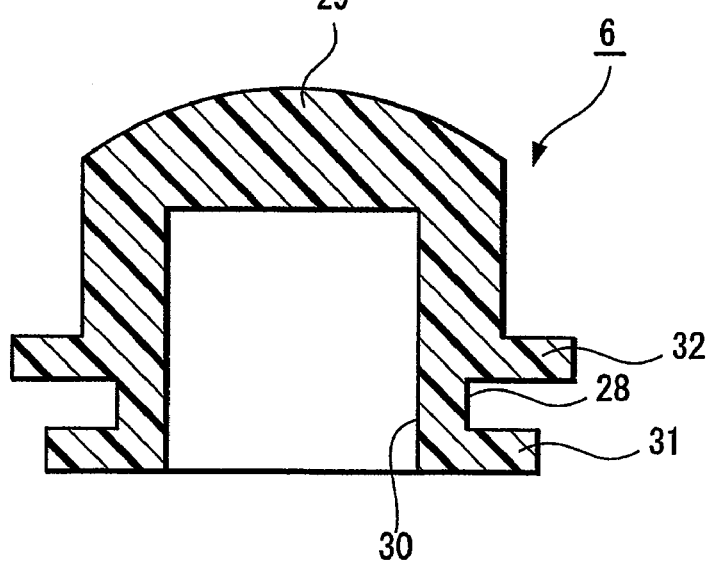

FIGS. 9A to 9C show the second projected portion 6 used in the present embodiment.

The second projected portion 6 shown in FIGS. 9A to 9C is a substantially cylindrical member. Further, an engaging groove 28 is formed on an outer periphery of one end portion in an axial direction of the second projected portion 6. The engaging groove 28 is a recessed portion continuously extending in a circumferential direction of the second projected portion 6. Further, a contact portion 29 to be in contact with the placement surface G of a desk or the like is provided on an end of the second projected portion 6 on the opposite side to the engaging groove 28. A tip end of the contact portion 29 is formed, for example, in substantially spherical shape with the central portion thereof projecting outwardly. Since the tip end of the contact portion 29 is formed in the substantially spherical shape, the contact portion 29 of the second projected portion 6 comes into point-contact with the placement surface G.

Note that, although the present embodiment is described using an example in which the contact portion 29 is formed in the spherical shape, the shape of the contact portion 29 is not limited thereto. For example, the contact portion 29 may also be formed in a circular shape, a rectangular shape, a truncated-cone shape, a truncated-pyramid shape or the like, and in such cases the contact portion 29 may come into face-contact with the placement surface G.

Further, as shown in FIG. 9C, an axial hole 30 is formed in one end in an axial direction of the second projected portion 6. The axial hole 30 has a predetermined length extending from an end face of the one end of the second projected portion 6 along the axial direction. By forming the axial hole 30 in the second projected portion 6, the rigidity of the one end in an axial direction of the second projected portion 6 is reduced, so that the second projected portion 6 becomes easy to be elastically deformed. Since the end portion on the side of the axial hole 30 of the second projected portion 6 is easy to be elastically deformed, the engaging groove 28 of the second projected portion 6 can be easily engaged to the engaging hole 26 of the leaf spring 24. Further, since the engaging groove 28 is formed in the second projected portion 6, an outer flange portion 31 and an inner flange portion 32 are consequently formed in the outer periphery of the one end in the axial direction of the second projected portion 6. The diameter of the inner flange portion 32 is larger than that of the outer flange portion 31. Note that, although the present embodiment is described using an example in which the second projected portion 6 is formed in a cylindrical shape, the second projected portion 6 may be formed in other shapes such as a polygonal prism shape.

Figure 10:
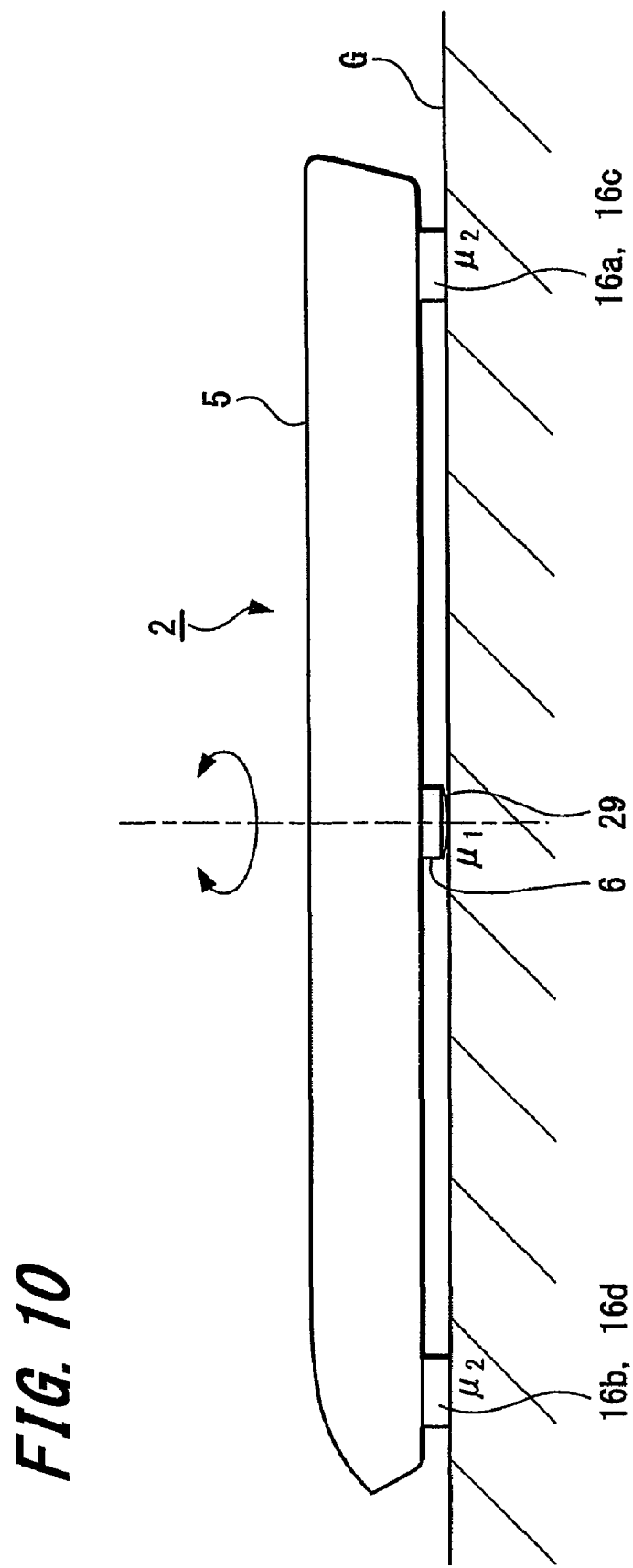
FIG. 10 is a side view showing the digitizer of the aforesaid embodiment in a state where the digitizer is placed on a placement surface.

As shown in FIG. 10, the friction coefficient $\mu1$ of the second projected portion 6 against the placement surface G is set to be larger than the friction coefficient $\mu2$ of the four first projected portions 16a to 16d against the placement surface G (specifically, $\mu1 > 4 \times \mu2$). Accordingly, it is preferred that the material of the second projected portion 6 is less slippery than the material of the four first projected portions 16a to 16d. For example, a silicon rubber may be used as the material of the second projected portion 6. Incidentally, instead of using the silicon rubber as the material of the second projected portion 6, the surface of the contact portion 29 may be specially treated so as be roughened or may be coated with a material having a large friction coefficient.

As shown in FIG. 1, when a force smaller than the static frictional force of the second projected portion 6 but larger than that of the four first projected portions 16a to 16d is applies to the input device 1 from the side face of the case 5 by the user, the second projected portion 6 will remain unmoved while the four first projected portions 16a to 16d, which have smaller static frictional force, will slide against the placement surface G. As a result, as shown in FIGS. 1 and 10, the case 5 is rotated with the second projected portion 6 as a rotation axis while the input device 1 is maintained in substantially horizontal state.

Since it is made possible to rotate the case 5 with the second projected portion 6 as a rotation axis while the input surface of the input portion 4 is maintained in substantially horizontal state, the orientation or direction of the case 5 can be easily changed into the orientation or direction in which the user feels comfortable to perform the handwriting input operation. Thus, since the orientation or direction of the case 5 can be changed into the orientation or direction in which the user feels comfortable to perform the handwriting input operation, working efficiency of the user can be improved.

The second projected portion 6 is attached to the leaf spring 24 by engaging the engaging groove 28 thereof with the engaging hole 26 of the leaf spring 24. As shown in FIG. 6, in a state where the lower case 8 is overlapped with the upper case 7, the contact portion 29 of the second projected portion 6 is projected to the outside of the case 5 from the insertion hole 17 of the lower case 8. At this time, the second projected portion 6 is located within or inside the area surrounded by the four first projected portions 16a to 16d on the rear surface of the lower case 8. In order to prevent rattling when the input device 1 is placed on the placement surface G, it is preferred that the projecting length of the second projected portion 6 from the lower case 8 is substantially equal to the height in the axial direction of the four first projected portions 16a to 16d.

However, in the production process, it may be difficult to assure that the four first projected portions 16a to 16d and the second projected portion 6 have the same height for all products, so that piece-to-piece variation is likely to occur. Thus, when merely attaching the second projected portion 6 to the lower case 8, it may be impossible to ensure that the four first projected portions 16a to 16d and the second projected portion 6 have the same height. As a result, if the second projected portion 6 projects more than the four first projected portions 16a to 16d, rattling may occur; and if the second projected portion 6 projects less than the four first projected portions 16a to 16d, since the contact portion 29 does not contact the placement surface G, there is a concern that the second projected portion 6 may not properly function.

Figure 11:
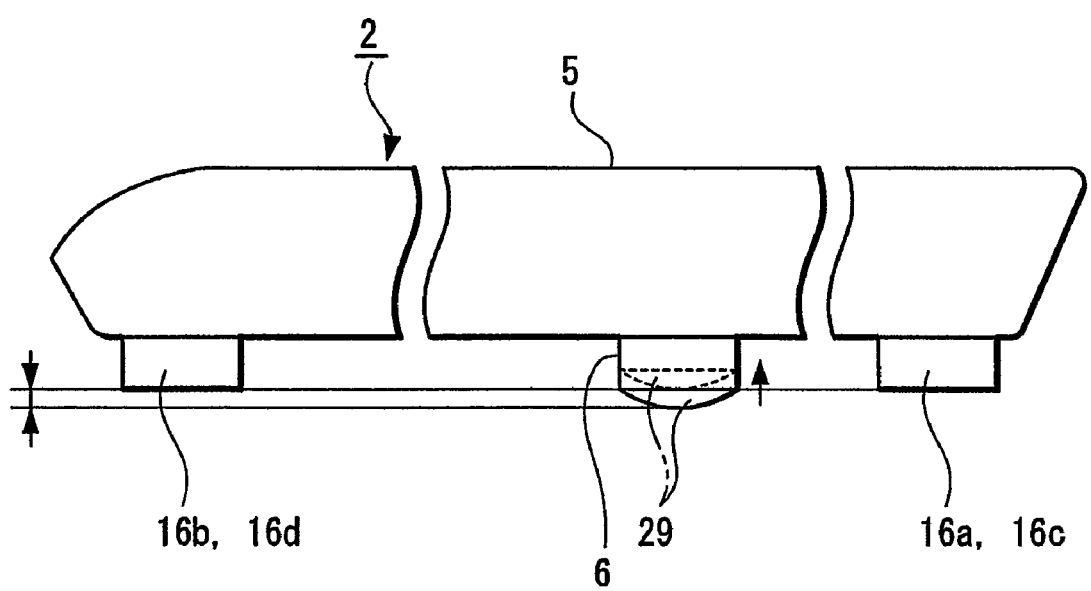
FIG. 11 is an illustration explaining the relationship between the height of first projected portions and the height of the second projected portion.

According to the present embodiment, the second projected portion 6 is attached to the frame 9 through the leaf spring 24. With such an arrangement, as shown in FIG. 11, even if the four first projected portions 16a to 16d and the second projected portion 6 do not have the same height, the leaf spring 24 will be elastically deformed due to the gravity of the case 5 when the case 5 is placed on the placement surface G. As a result, it is possible to make the projecting length of the second projected portion 6 from the lower case 8 and the height in the axial direction of the four first projected portions 16a to 16d equal to each other. In other words, it is possible to allow the tip end of the contact portion 29 of the second projected portion 6 and the one ends of the four first projected portions 16a to 16d to be located in the same plane. Since the tip end of the contact portion 29 of the second projected portion 6 and the one ends of the four first projected portions 16a to 16d are located in the same plane, rattling of the case 5 when placed on the placement surface G can be prevented or suppressed, and the input surface of the input portion 4 can be maintained in a substantially horizontal state.

Figure 12:
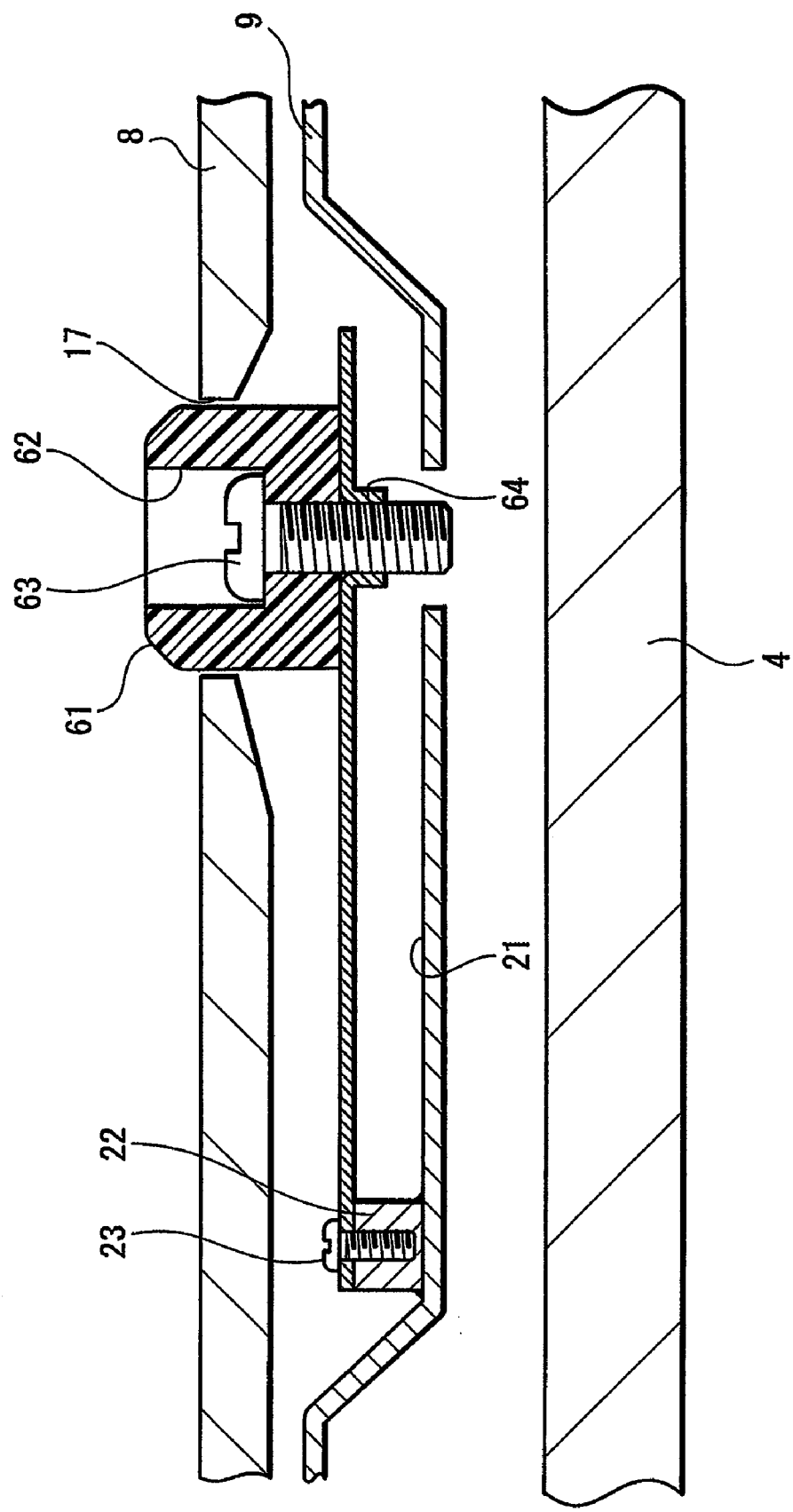
FIG. 12 is a cross section showing another example of the second projected portion of the digitizer.

As for the fixing method for fixing the second projected portion 6, although the present embodiment is described using an example in which the engaging groove 28 of the second projected portion 6 is engaged with the engaging hole 26 of the leaf spring 24, the present invention is not limited to that example. FIG. 12 is a cross section showing another example of the second projected portion of the digitizer according to a different embodiment of the present invention. A second projected portion 61 of this example is formed in cylindrical shape. A central portion of the second projected portion 61 is formed with a fixing hole 62, into which a fixing screw 63 is inserted. Further, instead of having the engaging hole 26, the leaf spring 24 has a screw hole 64, into which the fixing screw 63 is inserted. Further, the second projected portion 61 is fixed to the leaf spring 24 with the fixing screw 63. With the second projected portion 61, the effects of the second projected portion 6 also can be achieved.

Figure 13:
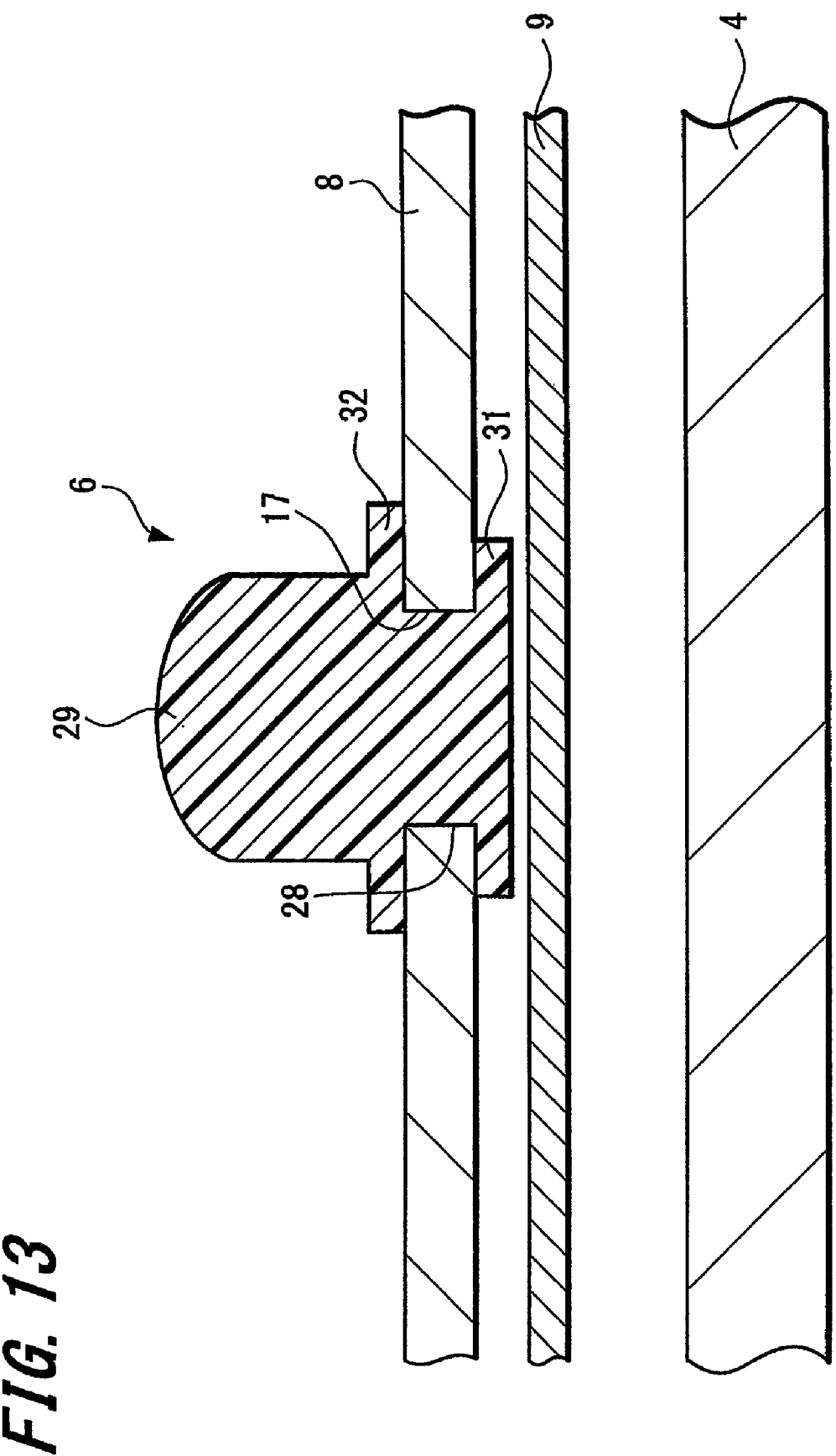
FIG. 13 is a cross section showing a further example of the second projected portion of the digitizer.

Although the present embodiment is described using an example in which the second projected portion 6 is attached to the frame 9 through the leaf spring 24 as an elastic body, the present invention is not limited to that example. As shown in FIG. 13, the second projected portion 6 may also be directly attached to the lower case 8 by engaging the engaging groove 28 of the second projected portion 6 with the insertion hole 17. Note that, although FIG. 13 shows an example in which the second projected portion 6 is directly attached to the lower case 8 and not through an elastic body, the second projected portion 6 may also be attached to the lower case 8 through an elastic body in the same manner as is described above.

The digitizer 2 according to the present embodiment can be assembled by the following steps. First, the input portion 4 is fitted into the opening 11 of the upper case 7 and fixed to the opening 11 with screws or the like. Then, as shown in FIG. 4, the frame 9 is fixed to the upper case 7 with fixing screws 18 so that the frame 9 covers, via the spacers 19, the rear surface of the input portion 4 fixed to the upper case 7.

Next, as shown in FIG. 8, the leaf spring 24 is fixed to the fixing portions 22a and 22b provided on the recessed portion 21 of the frame 9 with the fixing screws 23a and 23b. Next, the second projected portion 6 is oriented so that the outer flange portion 31 side (i.e., the side opposite to the contact portion 29) thereof faces the engaging hole 26 of the leaf spring 24 fixed to the frame 9. Further, the engaging groove 28 of the second projected portion 6 is engaged to the engaging hole 26 of the leaf spring 24, and thereby the second projected portion 6 is attached to the leaf spring 24. At this time, since the axial hole 30 is formed in the second projected portion 6, the second projected portion 6 is easy to be elastically deformed, and therefore the engaging groove 28 can be easily engaged to the engaging hole 26.

Next, the second projected portion 6 fixed to the leaf spring 24 is inserted into the insertion hole 17, and the lower case 8 is overlapped with the upper case 7 so that the opening of the upper case 7 is closed. At this time, the four first projected portions 16a to 16d are previously fixed to the four corners of the rear surface of the lower case 8 with a fixing means such as an adhesive. Further, the lower case 8 is fixed to the upper case 7 with the fixing screws 18, and thereby the assembling work of the digitizer 2 is completed.

As described above, in the digitizer according to various exemplary embodiments of the present invention, the case is provided with the second projected portion having the friction coefficient larger than that of the first projected portions against the placement surface. Further, the second projected portion is disposed inside of the area surrounded by the four first projected portions 16a to 16d. Thus, when a force smaller than the static frictional force of the second projected portion but larger than that of the first projected portions is applied to the case, the second projected portion will remain unmoved while the first projected portions, which have smaller static frictional force, will slide against the placement surface. Consequently, the case rotates with the second projected portion as a rotation axis. Thus, when drawing an illustration or the like with a pen-like input tool, if the case is oriented in a direction in which the user feels uncomfortable to perform the handwriting input operation, the user can easily rotate the case to a direction in which the user feels comfortable to perform the handwriting input operation. Thus, it is possible to provide a user-friendly digitizer capable of being rotated to a direction in which the user feels comfortable to perform the handwriting input operation without having to change his (or her) position.

Further, the second projected portion may be attached to the case through the elastic body. With such an arrangement, even if the second projected portion and the first projected portions do not have the same height, the elastic body will be elastically deformed when the case is placed on the placement surface. As a result, the height of the second projected portion and the height of the first projected portions become the same. Thus, the input surface of the input portion can be maintained in horizontal state, and rattling of the case can be prevented or suppressed. Further, since the contact portion of the second projected portion in contact with the placement surface may be formed in the spherical shape, the contact portion may come into point-contact with the placement surface. With such an arrangement, the case can be easily rotated.

It is to be understood that the present invention is not limited to the embodiments described above, and various modifications can be made without departing from the spirit and scope of the present invention. For example, although the aforesaid embodiments are described using an example in which the pen-like position indicator is employed as a concrete example of an input tool, a finger of the user can be used as an input tool in a case where coordinate detection of the input portion is performed based on a pressure-sensitive technology. Further, although the case and the input portion are formed in a quadrangular shape in the aforesaid embodiment, the case and the input portion may be formed in a circular shape, a triangular shape, a hexagonal shape, an octagon shape or the like.

What is claimed is:

1. A digitizer comprising:
  a case including an upper case and a lower case, the upper case having an opening for exposing an input portion of the digitizer therethrough, and the lower case being overlapped with the upper case, the case further including a substantially sheet-like frame arranged therein between the upper case and the lower case;
  at least three first projected portions fixed to the lower case, the first projected portions coming into contact with a placement surface so as to support the case on the placement surface; and
  a second projected portion projecting from the lower case in substantially the central portion of the lower case and inside of an area defined by connecting the points at which the first projected portions are fixed to the lower case, wherein the lower case includes an insertion hole through which the second projected portion extends, and a proximal end of the second projected portion is attached to the frame,
  wherein the second projected portion is configured to have a greater friction coefficient than the first projected portions such that, when a force substantially parallel to the placement surface is applied to the case, the first projected portions slide against the placement surface so as to cause the case to rotate relative to the placement surface with the second projected portion as a rotation axis.

2. The digitizer according to claim 1, including four first projected portions.

3. The digitizer according to claim 1, wherein the second projected portion includes a curved distal end surface.

4. The digitizer according to claim 1, wherein at least a distal end surface of the second projected portion is formed of silicon rubber.

5. The digitizer according to claim 1, wherein at least a distal end surface of the second projected portion is roughened or coated with a material having a large friction coefficient.

6. The digitizer according to claim 1, wherein at least distal end surfaces of the first projected portions are formed of felt material.

7. The digitizer according to claim 1, for use with an input tool for inputting information on the digitizer.

8. The digitizer according to claim 1, wherein the second projected portion is attached to the frame via an elastic body.

9. The digitizer according to claim 8, wherein the elastic body is formed by a leaf spring.

10. The digitizer according to claim 9, wherein the elastic body is a substantially rectangular leaf spring, one end in a longitudinal direction of the leaf spring is fixed to the frame, and the proximal end of the second projected portion is fixed to the other end of the leaf spring.

11. A digitizer comprising:
a case including an upper case and a lower case, the upper case having an opening for exposing an input portion of the digitizer therethrough, and the lower case being overlapped with the upper case;
at least three first projected portions fixed to the lower case, the first projected portions coming into contact with a placement surface so as to support the case on the placement surface; and
a second projected portion projecting from the lower case in substantially the central portion of the lower case and inside of an area defined by connecting the points at which the first projected portions are fixed to the lower case, the second projected portion being attached to the lower case via an elastic body;
wherein the second projected portion is attached to the lower case via an elastic body wherein the second projected portion is configured to have a greater friction coefficient than the first projected portions such that, when a force substantially parallel to the placement surface is applied to the case, the first projected portions slide against the placement surface so as to cause the case to rotate relative to the placement surface with the second projected portion as a rotation axis.

12. The digitizer according to claim 11, including four first projected portions.

13. The digitizer according to claim 11, wherein the second projected portion includes a curved distal end surface.

14. The digitizer according to claim 11, wherein at least a distal end surface of the second projected portion is formed of silicon rubber.

15. The digitizer according to claim 11, wherein at least at least a distal end surface of the second projected portion is roughened or coated with a material having a large friction coefficient.

16. The digitizer according to claim 11, wherein at least distal end surfaces of the first projected portions are formed of felt material.

17. The digitizer according to claim 11, for use with an input tool for inputting information on the digitizer.

18. The digitizer according to claim 11, wherein the elastic body is formed by a leaf spring.

19. The digitizer according to claim 18, wherein the elastic body is a substantially rectangular leaf spring, one end in a longitudinal direction of the leaf spring is fixed to the lower case, and the second projected portion is fixed to the other end of the leaf spring.

\* \* \* \* \*